United States Patent [19]

Kojima et al.

[11] Patent Number: 5,110,847
[45] Date of Patent: * May 5, 1992

[54] EMULSION WATER PAINT AND PROCESS FOR ITS PRODUCTION USING EPOXY ACRYLIC-RESOLVE RESIN BLENDS

[75] Inventors: Shunji Kojima, Yokosuka; Yoshiki Watanabe, Yokohama; Hiroaki Goto, Tokyo; Toshinori Moriga, Yokohama, all of Japan

[73] Assignee: Toyo Seikan Kaisha Ltd., Tokyo, Japan

[ * ] Notice: The portion of the term of this patent subsequent to Feb. 11, 2009 has been disclaimed.

[21] Appl. No.: 632,681

[22] Filed: Dec. 24, 1990

Related U.S. Application Data

[60] Division of Ser. No. 426,351, Oct. 25, 1989, Pat. No. 5,068,266, which is a continuation-in-part of Ser. No. 272,838, Sep. 27, 1988.

[30] Foreign Application Priority Data

Jan. 27, 1987 [JP] Japan .................. 62-15146
Jan. 27, 1987 [JP] Japan .................. 62-15147
Mar. 25, 1987 [JP] Japan .................. 62-69176
May 7, 1987 [JP] Japan .................. 62-109727
Jan. 27, 1988 [JP] Japan ............ PCT/JP88/00064

[51] Int. Cl.$^5$ ................. C09D 3/56; C09D 3/58; C09D 5/02; C09D 11/10
[52] U.S. Cl. ..................... 523/412; 523/336; 523/409; 523/411; 525/109

[58] Field of Search .................. 523/336, 409, 412

[56] References Cited

U.S. PATENT DOCUMENTS 4,579,888 4/1986 Kodama et al. ............ 523/412
4,591,609 5/1986 Kubo et al. ................ 523/336
4,857,566 8/1989 Helbling .................... 523/409

Primary Examiner—John C. Bleutge
Assistant Examiner—Frederick Krass
Attorney, Agent, or Firm—Sughrue, Mion, Zinn, Macpeak & Seas

[57] ABSTRACT

An o/w water paint having excellent dispersibility and stability is prepared according to a phase conversion process comprising adding ammonia or an amine and water to a solution of an epoxy resin, a hardener resin, and an acrylic resin in an organic solvent or to a molten mixture of these resins to neutralize the acrylic resin. In view of adhesion of a coat to metal and workability, branched alkylamines or heterocyclic amines are suitable as the neutralizing amines. In applying this paint, steam optionally containing fine water droplets is preferably applied to a wet coat prior to drying. Furthermore, a process for the continuous production of an emulsion type water paint comprising a carboxyl group-containing acrylic resin component, an epoxy resin component and a curing agent resin component for the epoxy resin is disclosed.

6 Claims, 2 Drawing Sheets

EMULSION WATER PAINT AND PROCESS FOR ITS PRODUCTION USING EPOXY ACRYLIC-RESOLVE RESIN BLENDS

This is a divisional of application Ser. No. 07/426,351 filed Oct. 25, 1989 now U.S. Pat. No. 5,068,266, which is a continuation-in-part application of the application Ser. No. 272838 filed on Sep. 27, 1988.

BACKGROUND OF THE INVENTION

(1) Field of the Invention

This invention relates to a water-based paint which is produced by a phase inversion emulsifying process utilizing the surface-activating action of an acrylic resin incorporated in a paint resin solution, and to a process for its production. More particularly, this invention relates to a process or continuously preparing an emulsion type water paint comprising a carboxyl group-containing acrylic resin component, an epoxy resin component and a component of a curing agent resin for the epoxy resin.

(2) Description of the Prior Art

In the production of cans for canning, it has been the previous practice to coat metallic blanks or cans themselves with various paints in order to prevent dissolving of metal in can contents or inhibit corrosion of the metal. In the case of not only deep-drawn cans produced from an uncoated metallic blank but also drawn cans or three-piece cans produced from a coated metallic blank, various paints are spray-coated and baked on can bodies or can closures in order to repair injuries caused to the coated film in the can-making process or to form top coats.

A paint comprising a combination of an epoxy resin and a curing agent resin and a vinyl-type paint are excellent in regard to adhesion to a metallic substrate, corrosion resistance, flavor characteristics and film processability. These paints exhibit good performance when coated in the form of an organic solvent solution. However, the solvent is dissipated in the working environment during spray coating, and problems of air pollution and environmental hygiene arise.

To eliminate these defects, water-based paints, namely paints in the form of an aqueous dispersion, have already been developed. A first type of such water-based paints comprises a paint resin rendered particulate by some means and dispersed in water using a surface-active agent or a water-soluble or hydrophilic resin as a dispersing agent (for example, Japanese Patent Publication No. 18076/1969). A second type is a paint obtained by reacting a paint resin having a functional group such as an epoxy resin with a resin having carboxyl groups such as an acrylic resin and neutralizing the modified resin with ammonia or an amine and causing it to self-emulsify in an aqueous medium (for example, Japanese Laid-Open Patent Publication No. 213718/1984).

However, the former type of water-based paint contains dispersed particles of the paint resin which generally tend to be large and non-uniform. Moreover, the water-based paint has low dispersion stability, and the properties of a coated film prepared from it is inferior to those of a film obtained from a solvent-based paint.

The later type of paint may have better dispersibility than the former type paint, but is greatly restricted in the composition of the paint resin. For example, in the case of an epoxy resin-type paint, it is difficult to secure a sufficiently high content of the resin curing agent, and the coated film cannot be fully cured. Consequently, the hardness and denseness of the coated film and its barrier property with respect to corrosive components cannot be improved to a satisfactory level.

Many coating methods have previously been proposed for forming good paint films using the above water-based paints.

For example, Japanese Laid-Open Patent Publication No. 133342/1977 described that a slurry-like paint is coated on an article, and until the coated film is subjected to drying under heating, it is maintained in an atmosphere having a temperature of not more than 100° C. at which, in addition, the resin particles do not melt, a relative humidity of at least 80%, and an air speed of not more than 0.3 m/sec thereby to prevent cracking during film formation.

When a water based paint containing emulsified resin particles is coated on the surface of a metallic substrate by such means as a roll coater, raised and depressed patterns such as ribs occur on the coated surface and remain there after drying and baking. Accordingly, the coated surface loses smoothness.

In the case of a paint in the form of an organic solvent solution, the resin solution has flowability and levelling of the wet coated film occurs during the time from coating to baking (generally called the period of setting). In the case of a dispersion-type water-based paint, such levelling is difficult presumably because the paint resin is present in the form of dispersed particles, the dispersing medium is water having a high surface tension and a high viscosity and evaporation of water proceeds considerably rapidly on the surface.

In a coating method using a dispersion-type water-based paint, no effective means has yet been known for alleviating raised and depressed patterns such as ribs occurring during coating and improving the levelness of the coated film.

A paint comprising an epoxy resin and a curing agent resin in combination or a vinyl-type resin is excellent in adhesion to a metallic substrate, corrosion resistance, flavor characteristics and processability of a coated film. However, it sometimes happens that a coated film formed from such a paint is not satisfactory in the smoothness and the completeness of covering. Namely, although occurrence of ribs can be prevented on the surface of the coated film formed from the above-mentioned paint, hard spots are readily formed on the surface, with the result that the surface smoothness is degraded and the covering of the substrate becomes incomplete.

We previously proposed a process in which an organic solvent solution containing a carboxyl group-containing acrylic resin component is prepared, ammonia or an amine and water are incorporated into the organic solvent solution to convert the carboxyl group in the acrylic resin to an ammonium salt or amine salt, and simultaneously, the resin component in the solution is self-emulsified to an o/w type emulsion. Namely, according to this process, a water paint is prepared by the phase inversion.

According to this process, however, since the resin solution has a considerably high viscosity, a large quantity of an organic solvent has to be used, and therefore, a large quantity of water should be incorporated for the phase inversion. Accordingly, the solid concentration in the formed aqueous emulsion is generally low, and a large quantity of the liquid should be handled. Therefore, the process is disadvantageous in that the dimensions of the apparatus should be increased and relatively large quantities of the solvent and water should be removed from the formed emulsion by evaporation.

SUMMARY OF THE INVENTION

It is an object of this invention, therefore, to provide a water-based paint free from the above problems of a prior art water-based paint, and a novel process for its production.

Another object of this invention is to provide a water-based paint produced by a phase inversion emulsifying method applicable to a paint resin solution of any composition by utilizing the surface-activating action of an acrylic resin incorporated in the paint resin, and to a process for production thereof.

Still another object of this invention is to provide a process in which an emulsion type water paint having a high solid concentration and a small particle size can be prepared at a high efficiency by using a relatively compact apparatus and relatively small amounts of a solvent and water.

Yet another object of this invention is to provide a method of forming a coated film having excellent levelling property and appearance by removing raised and depressed patterns such as ribs formed on the surface of a wet coated film during coating of a dispersion-type water-based paint before the drying or backing of the coated film.

A further object of this invention is to provide a process for forming a coated film, in which formation of raised and depressed patterns, such as ribs, on the surface of the coated film is prevented, formation of hard spots is prevented on the coating and smoothness and covering completeness of the coating are improved.

More specifically, in accordance with this invention, there is provided a process for the continuous production of an emulsion type water paint, which comprises feeding an organic solvent solution comprising a carboxyl group-containing acrylic resin component, an epoxy resin component and a component of a curing agent resin for the epoxy resin independently or in combination, together with an aqueous solution of ammonia or an amine, to an in-line mixer of the first stage, mixing the solution under compression in the mixer to form a w/o type emulsion, feeding the w/o type emulsion together with water to an in-line mixer of the second stage, mixing the w/o type emulsion and water in the mixer to effect the phase inversion to an o/w emulsion, and withdrawing the formed o/w type emulsion quantitatively.

Furthermore, in accordance with this invention, there is provided an emulsion type water paint, which comprises a carboxyl group-containing acrylic resin component, an epoxy resin component and a resol type phenolic resin component as coating film-forming components, wherein the carboxyl group of the acrylic resin component is present in the form of an ammonium salt or amine salt, the coating film-forming components are present in the form of o/w type emulsion particles, and at least 30 mole % of the total methylol groups of the resol type phenolic resin component are alkyl-etherified.

In this invention, it is preferred that the etherified product of the resol type phenolic resin component be a butyl-etherified product, and especially good results can be obtained if the resol type phenolic resin comprises 10 to 98% by weight, particularly 20 to 95% by weight, of a mono-nuclear or bi-nuclear low- molecular-weight product.

DETAILED DESCRIPTION OF THE INVENTION

Figure 1:
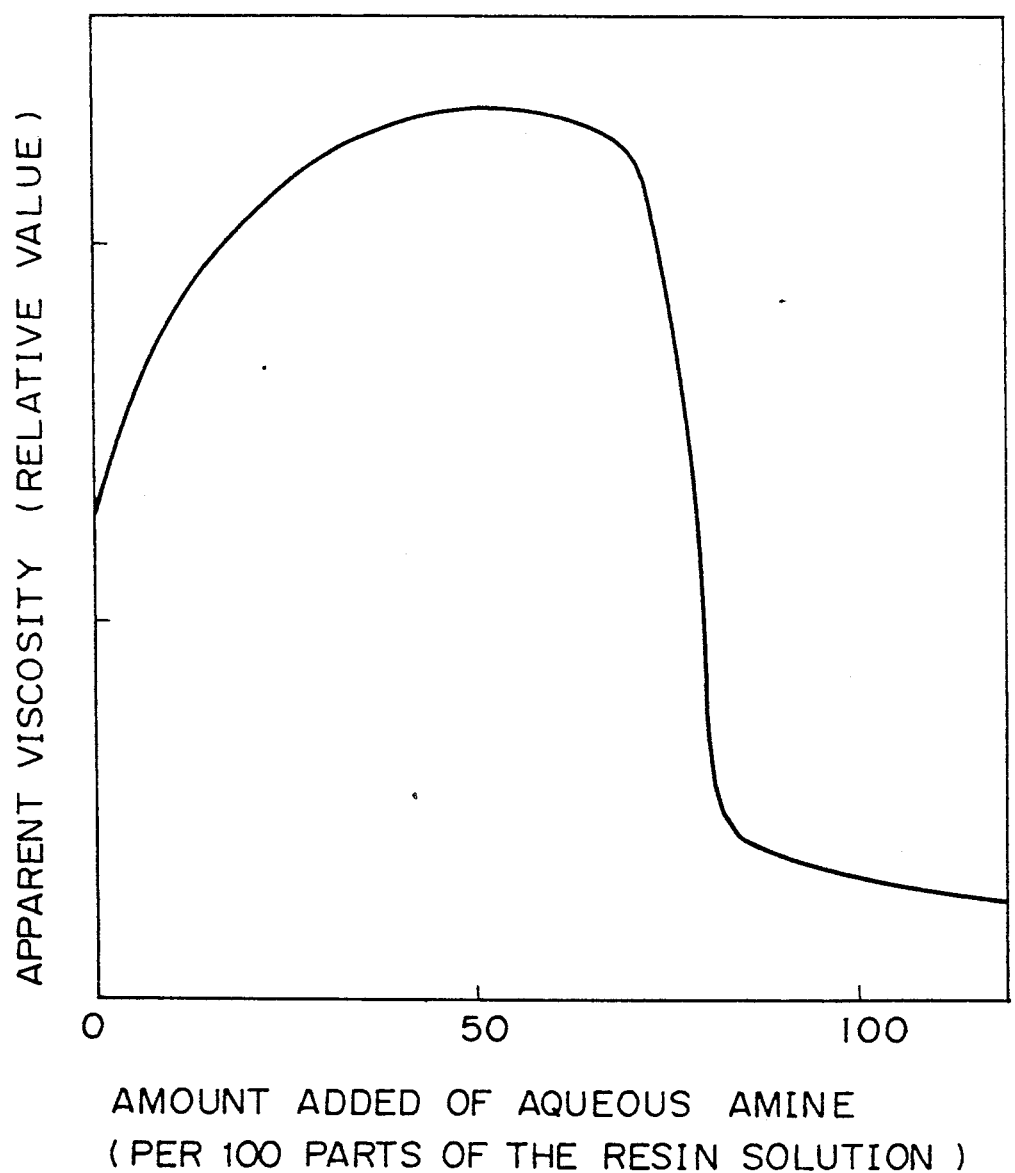
FIG. 1 shows the relative values of the apparent viscosity versus the amount of an aqueous solution of an amine per 100 parts of the resin solution.

The paint solution used in this invention comprises an acrylic resin component, an epoxy resin component and a component of a curing agent resin for the epoxy resin as three indispensable components. In this invention, the carboxyl group-containing acrylic resin components and the epoxy resin component may be contained in the form of a copolymer of both the components in the solution, or the carboxyl group-containing acrylic resin component and the epoxy resin component may be contained in the form of a blend in the solution. In this invention, it is preferable at this time to adjust the acid value of the acrylic resin to 35 to 350, especially 70 to 330, and use of the acrylic resin in an amount of 3 to 30% by weight, especially 5 to 25% by weight, based on the paint resin.

If the acid value of the acrylic resin is lower than the above-described limit, it is difficult to emulsify the paint resin component into fine and uniform o/w (oil-in-water) type dispersed resins in a neutralization step and a phase inversion emulsification step to be described, and the emulsion stability of the dispersed particles tend to be lowered. If the acid value of the acrylic resin is higher than the specified limit, the acrylic resin tends to separate from the paint resin component and migrate to the aqueous phase in the subsequent and migrate to the aqueous phase in the subsequent steps. For this reason, the paint resin is difficult to emulsify into a fine and uniform particle size, and the stability of the dispersion is rather reduced. Furthermore, the resulting coated film is prone to become sensitive to humidity. According to this invention, by selecting the acid value of the acrylic resin within the above-specified range, it is possible to emulsify the paint resin component into a uniform and fine size and improve the dispersion stability of the emulsified resin, and the resulting coated film can have excellent moisture resistance and water resistance.

If the amount of the acrylic resin incorporated is smaller than the above-specified limit, sufficient carboxylate salt groups cannot be formed in the interface between the aqueous phase and the oil phase (resin phase) in the neutralization step and the phase inversion step. Consequently, the paint resin component is difficult to emulsify into a uniform and fine particle size, and the dispersion stability of the aqueous dispersion is reduced. On the other hand, if the amount of the acrylic resin is larger than the above-specified limit, the inclusion of a large amount of the acrylic resin in the paint resin component effects the properties of the resulting coated film. Accordingly, the amount of the acrylic resin should be confined within the above-specified range.

According to this invention, the organic solvent solution or the molten of the paint resin and the acrylic resin is converted to an oil-in-water (o/w) type emulsion. In the dispersed resin particles in the o/w type emulsion, the paint resin and the acrylic resin are in the blended or mutually dissolved state. It is presumed that the ammonium salt or amine salt groups of carboxylic acid formed in the acrylic resin are directed to the surface of the dispersed resin particles, namely to the interface between the resin and water.

Such an emulsion is prepared by a phase inversion method which comprises mixing or kneading the organic solvent solution or the molten mixture containing the paint resin and the acrylic resin with ammonia or an amine and water to convert the carboxyl groups in the acrylic resin into an ammonium or amine salt and allowing the resin component in the solution to self-emulsify into an o/w type emulsion. In this case, ammonia or the amine may be fed into the system separately from water. Generally, however, it is advisable to feed them together with water in the form of an aqueous solution of ammonia or the amine.

When an aqueous solution of ammonia or the amine is added to the organic solvent solution containing the paint resin and the acrylic resin, the viscosity of the solution rises in the initial stage of the addition as shown in the attached FIG. 1. As the addition is continued, the viscosity of the system gradually decreases. If the addition is suspended at this stage and the entire system is homogenized by stirring and the addition of the aqueous ammonium or amine solution is again continued, the viscosity of the system abruptly decreases. In the early stage when the aqueous ammonia or amine solution is added to the resin solution, the aqueous phase exists in the form of a dispersed phase, but in the stage where the viscosity of the system abruptly decreases, an o/w type emulsion in which the aqueous phase is a continuous (dispersion medium) phase and the resin component is a dispersed phase forms stably. The present invention is based on the finding that by the method of phase inversion emulsification of the solution containing the paint resin and the acrylic resin, a self-emulsifiable water-based paint having a fine and uniform dispersed resin particle diameter and excellent dispersion stability can be obtained.

In this invention, an organic solvent solution containing a carboxyl group-containing acrylic resin component, an epoxy resin component and a component of a curing agent resin for the epoxy resin can be employed singly or in combination (sometimes referred to as "resin solution" hereinafter). This invention is prominently characterized in that this resin solution is fed together with an aqueous solution of ammonia or an amine to an in-line mixer of the first stage, and the solution are mixed under compression to once form a w/o type (water-in-oil type) emulsion, this w/o type emulsion is fed together with water to an in-line mixer of the second stage and the w/o type emulsion and water are mixed to form an o/w type (oil-in-water type) emulsion by the phase inversion, and the o/w type emulsion formed by the phase inversion is quantitatively withdrawn.

When an o/w type aqueous dispersion is prepared from a resin solution by the phase inversion, mixing under stirring should be carried out while gradually adding aqueous ammonia or aqueous amine and a long time is required for completion of this mixing under stirring, and this is an obstacle to the industrialization of the continuous production. The present invention is based on the finding that if the resin solution is mixed with an aqueous solution of ammonia or an amine prior to the phase inversion to form a w/o type emulsion in which water is dispersed in the form of fine particles in the resin solution and this w/o type emulsion is then mixed with water to effect the phase inversion to an o/w type emulsion, the time required for addition and mixing is drastically shortened and the continuous production becomes possible.

The acrylic resin is present in the state dissolved or blended in the other paint resin, but the carboxyl group contained in the acrylic resin component is neutralized with the added ammonia or amine and is directed in the form of a salt to the interface to water, whereby the emulsion is formed from the resin solution. In this invention, at the first step of forming the w/o type emulsion, all of ammonia or an amine necessary for this neutralization is added, whereby the phase conversion to the o/w type from the w/o type can be performed by a simple mechanism.

According to this invention, an in-line mixer is used for realizing intimate mixing between the resin solution and aqueous ammonia or aqueous amine and between the w/o type emulsion and water and also for ensuring a sufficient residence time for the treated product in the apparatus. Since mixing of the resin solution with aqueous ammonia or aqueous amine is carried out in a state where the viscosity is very high, this mixing is conducted under compression for preventing the cavitation. According to this process of the present invention, a very uniform and fine w/o type emulsion can be formed, and this uniform and fine w/o type emulsion can be converted to a uniform and fine o/w type emulsion by the phase inversion.

Figure 2:
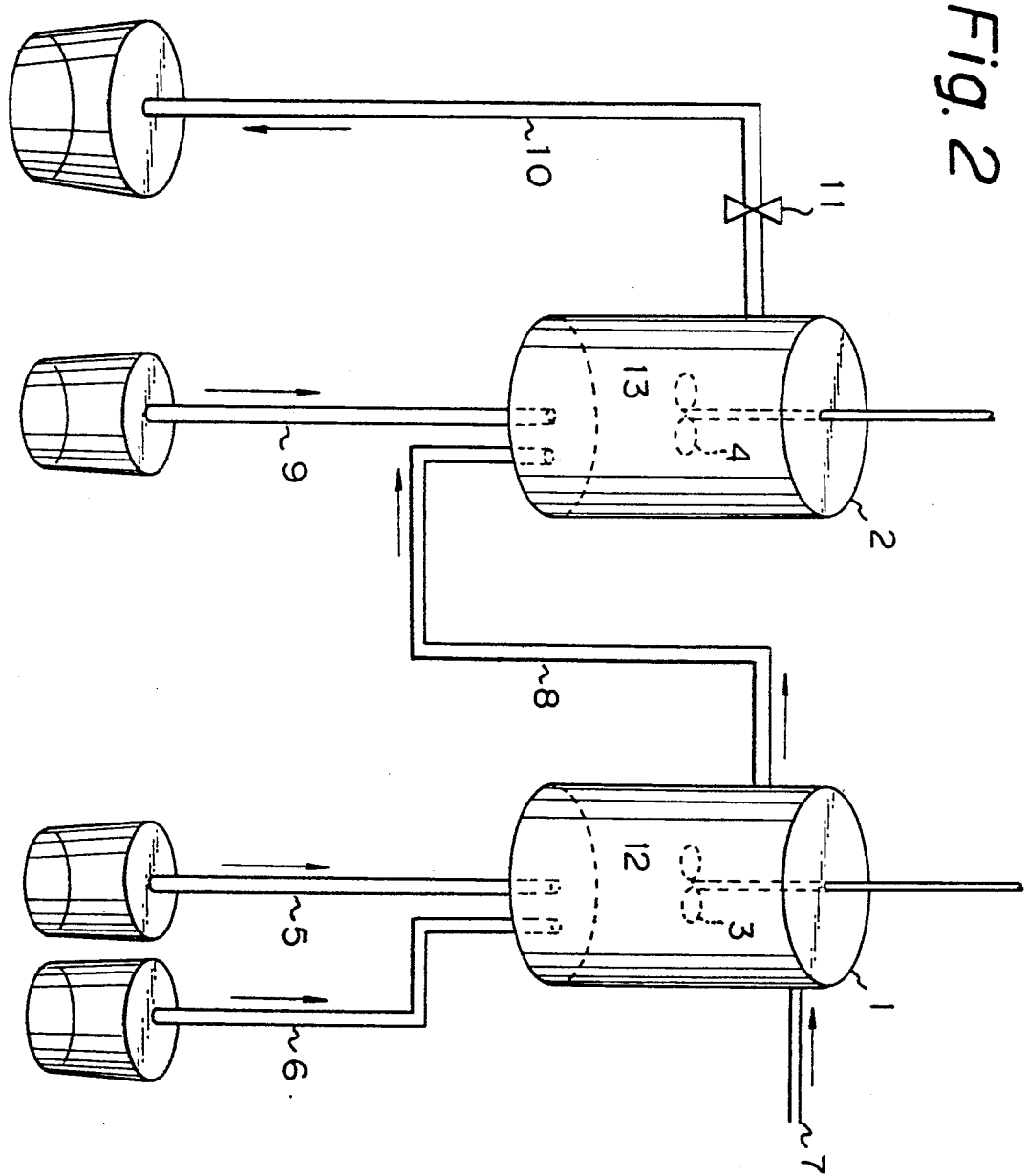
FIG. 2 is a diagram illustrating the schematic arrangement of the apparatus for use in carrying out the continuous production process.

Referring to FIG. 2 showing the schematic arrangement of the apparatus for use in carrying out the continuous production process of this invention, this apparatus comprises a first treatment tank 1 for formation of a w/o type emulsion, which has an in-line mixer 3 disposed in the interior thereof, and a second treatment tank 2 for formation of an o/w type emulsion, which has an in-line mixer 4 disposed in the interior thereof. A resin solution supply line 5, an aqueous ammonia or aqueous amine supply line 6 and a line 7 for compression of the interior of the tank are arranged in the first treatment tank 1. The first treatment tank 1 is connected to the second treatment tank 2 through a connecting tube 8. A water supply line 9 and a product withdrawal line 10 are arranged in the second treatment tank 2, and a predetermined rate discharge valve 11 is disposed in the product withdrawal line 10.

The resin solution and aqueous ammonia or aqueous amine are fed to the first treatment tank 1 from the supply line 5 and supply line 6, respectively, and a compressing fluid such as nitrogen, air or steam is fed to the first treatment tank 1 from the compression line 7 to maintain a predetermined pressure in the first treatment tank 1. The in-line mixer 3 is driven to mix both the solutions under compression and form a w/o type emulsion 12. The formed w/o type emulsion 12 is fed to the second treatment tank 2 through the connecting tube 8. Water is supplied to the second treatment tank 2 through the water supply line 9 and the w/o type emulsion is mixed with water by the in-line mixer 4 to form an o/w type emulsion 13 by the phase inversion. The formed o/w type emulsion 13 is withdrawn as a product from the apparatus through the withdrawal line 10 and the predetermined rate discharge valve 11. In this process, since the interior of the first treatment tank 1 is compressed and the first treatment tank 1 is connected to the second treatment tank 2 through the connecting tube 8, the w/o type emulsion in an amount corresponding to the amount of the o/w type emulsion discharged from the second treatment tank 2 is fed to the second treatment tank 2 from the first treatment tank 1, and the treatment of the two stages can be smoothly performed in a continuous manner.

FIRST STEP

Aqueous ammonia or aqueous amine is used for the neutralization of the resin solution. As the amine to be used for the neutraslization of the resin solution, there can be mentioned alkylamines such as trimethylamine, triethylamine and n-butylamines such as 2-dimethylamino-ethanol, diethanolamine, triethanolamine, aminomethylpropanol and dimethylaminomethylpropanol. Furthermore, polyvalent amines such as ethylenediamone and diethylenetriamine can be used. Moreover, amines having a branched alkyl group and heterocyclic amines are preferably used. As the branched alkyl group-containing amine, there can be used branched alkylamines having 3 to 6 carbon atoms, especially 3 to 4 carbon atoms, such as isopropylamine, sec-butylamine, tert-butylamine and isoamylamine. As the heterocyclic amine, there can be used saturated heterocyclic amines having one nitrogen atom, such as pyrrolidine, piperidine and morpholine. It is preferred that the ammonia or amine be used in an amount of at least 0.3 chemical equivalent, especially 0.7 to 1.3 chemical equivalents, to the carboxyl group of the acrylic resin.

It is preferred that mixing of the resin solution (A) and the aqueous ammonia or aqueous amine (B) be carried out while feeding both the liquids to the first treatment tank at an (A)/(B) weight ratio of from 10 to 10/1, especially from 10/9 to 10/4. If the amount of the aqueous ammonia or aqueous amine is too large and exceeds the above range, the phase inversion to the o/w type emulsion is caused without stable formation of the w/o type emulsion, and therefore, the particle size of the dispersed phase of the formed o/w type emulsion tends to increase. If the amount of the aqueous ammonia or aqueous amine is too small and below the above-mentioned range, a relatively large amount of water should be added for the phase inversion of the formed w/o type emulsion to the o/w type emulsion, and the phase inversion becomes unstable and the particle size of the dispersed phase is irregular.

As pointed out hereinbefore, it is important that mixing in the in-line mixer of the first stage should be carried out under compression. It is preferred that the degree of the compression be 0.2 to 10 kg/cm² (gauge), especially 0.5 to 7 kg/cm² (gauge). It also is preferred that the mixing temperature be 10° to 90° C., especially 15° to 70° C. Mixing at the first stage trains the neutralization reaction and is carried out with violent stirring, and therefore, it should be understood that the temperature is sometimes elevated to a level higher than 100° C. by generation of heat. Of course, when a high temperature is desired, external heating may be carried out, or if elevation of the temperature is not desired, external cooling may be carried out.

It is preferred that the degree of mixing by the in-line mixer be such that the stirring efficiency (K) expressed by the following formula is 5 to 50, especially 7 to 35:

$$K = V_2/V_1$$

wherein $V_1$ stands for the feed rate (l/mi.) to the in-line mixer and $V_2$ stands for the extrusion rate (l/min) of the stirrer in the in-line mixer, measured by using water. If the value K is too small and below the above range, it sometimes happens that a uniform and fine w/o type emulsion cannot be obtained. If the value K is too large and exceeds the above-mentioned range, the speed of the production of the water paint is low and the process becomes disadvantageous from the industrial viewpoint.

SECOND STEP

At the second step of the process of this invention, the w/o type emulsion formed at the first step is fed together with water to the in-line mixer of the second stage to effect the phase inversion to the o/w type emulsion.

The amount of water used at this second step depends on the amount of water in the w/o type emulsion fed from the first step but this amount of water should be enough to effect the phase inversion to the o/w type emulsion sufficiently. Namely, the amount of water is generally 30 to 100 parts by weight and especially 35 to 80 parts by weight per 100 parts by weight of the w/o type emulsion.

The phase inversion step can be advanced relatively easily, as compared with the w/o type emulsion-forming first step, and the temperature and time are not particularly critical. However, since the w/o type emulsion at the first step communicates with the o/w type emulsion at the second step, the second step is carried out substantially under the same temperature and pressure conditions as adopted at the first step.

The formed o/w type emulsion is quantitatively withdrawn from the apparatus through the predetermined rate discharge valve. This quantitative withdrawal can be continuously carried out at a constant rate, or can be carried out intermittently at certain time intervals.

POST TREATMENT

The aqueous dispersion obtained by the phase inversion contains both of water and the organic solvent. If this aqueous dispersion is subjected to the azeotropic distillation under reduced pressure, the organic solvent can be removed by the azeotropic distillation with water, or the aqueous dispersion can be concentrated. It must be understood that the azeotropic distillation of the organic solvent can be carried out while supplying water from the outside.

It is preferred that the concentration of the paint resin solids in the final water paint by 10 to 70% by weight, especially 20 to 60% by weight, and it also is preferred that the content of the organic solvent in the water paint be up to 15% by weight, especially up to 5% by weight. A small amount of a surface active agent or a polymeric dispersant can be added to the system at an optional stage in order to improve the dispersion stability of the resin components in the paint.

RESIN COMPONENTS

The acrylic resin used in this invention may be any acrylic resin which has an acid value within the aforesaid range. The acrylic resin is composed of a copolymer of an ethylenically unsaturated carboxylic acid or its anhydride which gives carboxyl groups of the aforesaid acid value to the resin and an acrylic or methacrylic ester and as desired, another ethylenically unsaturated monomer copolymerized with these monomers. Examples of the ethylenically unsaturated carboxylic acid or its anhydride include acrylic acid, methacrylic acid, crotonic acid, maleic acid, phthalic acid, itaconic acid, citraconic acid, maleic anhydride and itaconic anhydride.

Examples of the acrylic or methacrylic ester include methyl (meth)acrylate, ethyl (meth)acrylate, isopropyl (meth)acrylate, n-butyl (meth)acrylate, isobutyl (meth)acrylate, n-amyl (meth)acrylate, isoamyl (meth)acrylate, n-hexyl (meth)acrylate, 2-ethylhexyl (meth)acrylate and n-octyl (meth)acrylate. The (meth)acrylate represents an acrylate and a methacrylate.

The other comonomer to be copolymerized with these monomers may be, for example, styrene, vinyltoluene, acrylonitrile, or methacrylonitrile.

The acrylic resin should have a molecular weight sufficient for film formation. Desirably, it has a molecular weight of generally 1,000 to 20,000, especially 2,000 to 15,000.

Examples of suitable monomer combinations of the acrylic copolymer are (1) methyl methacrylate/2-ethylhexyl acrylate/acrylic acid, (2) styrene/methyl methacrylate/ethyl acrylate/methacrylic acid, (3) styrene/ethyl acrylate/methacrylic acid, and (4) methyl methacrylate/ethyl acrylate/acrylic acid.

These acrylic resins can be easily obtained by polymerizing these monomers in an organic solvent in the presence of azobisisobutyronitrile or a peroxide.

On the other hand, the paint resin that can be used may be at least one thermosetting resin or thermoplastic resin which is soluble in an organic solvent. Examples include a phenol-formaldehyde resin, a furane-formaldehyde resin, a xylene-formaldehyde resin, a ketone-formaldehyde resin, a urea-formaldehyde resin, a melamine-formaldehyde resin, an alkyd resin, an unsaturated polyester resin, an epoxy resin, a bismaleimide resin, a triallylcyanurate resin, a thermosetting acrylic resin, a silicone resin, an oily resin, a vinyl chloride/vinyl acetate copolymer, a partially saponified vinyl chloride/vinyl acetate copolymer, a vinyl chloride/maleic acid copolymer, a vinyl chloride/maleic acid/vinyl acetate copolymer, an acrylic polymer, and a saturated polyester resin. These resins may be used singly or in combination as the paint resin.

A combination of an epoxy resin and a curing agent resin for the epoxy resin may be cited as an example of a paint resin especially suitable for can making. A suitable epoxy resin is a bisphenol-type epoxy resin obtained by polycondensation of a bisphenol such as bisphenol A with an epihalohydrin. Preferably, this epoxy resin has an epoxy equivalent of generally 400 to 20,000, especially 1,000 to 5,000, and a number average molecular weight of generally 1,000 to 20,000, especially 2,000 to 13,000.

The curing agent resin reactive with the epoxy resin is a resin having a functional group reactive with the hydroxyl group or oxirane ring of the epoxy resin, such as a hydroxyl, amino or carboxyl group. Examples are resol-type and/or novolak-type phenol/formaldehyde resins, urea/formaldehyde resins, melamine/formaldehyde resins, alkyd resins, polyester resins, acrylic resins, polyurethane resins, xylene resins, epoxy ester resins and butyral resins. They may be used singly or in combination. Thermosetting resins containing a methylol group, particularly resol-type phenolic resins, are preferred among them. A marked characteristic feature of the present invention is that even when the agent resin is any desired value, the paint resin can be dispersed and emulsified in resin particles with a fine particle diameter. Generally, the ratio of the epoxy resin to the curing agent resin is from 95:5 to 40:60, especially from 90:10 to 50:50.

According to this invention, paint resins generally called solvent-based vinyl paints or organosol-type vinyl paints can also be converted to emulsion-type water-based paints.

The solvent-based vinyl paints generally use a combination of (A) a vinyl chloride copolymer which is solvent-soluble and has carboxyl or hydroxyl groups and (B) a thermosetting resin.

Preferably, the solvent-soluble vinyl chloride copolymer (A) contains carboxyl and/or hydroxyl groups in a concentration of 5 to 500 millimoles/100 g of resin, particularly 10 to 300 millimoles/100 g of resin. Suitable examples include a partially saponified vinyl chloride/vinyl acetate copolymer, a vinyl chloride/vinyl acetate/acrylic acid copolymer, a partially saponified and partially butyralized vinyl chloride/vinyl acetate copolymer, a vinyl chloride/vinyl acetate/methacrylic acid copolymer, a vinyl chloride/vinyl acetate/maleic anhydride, a vinyl chloride/vinyl acetate/hydroxyethyl acrylate copolymer and a partially saponified vinyl chloride/vinyl acetate/acrylic acid copolymer. Preferred examples of the thermosetting resin (B) are those exemplified as the epoxy resin or the curing agent resin therefore. The weight ratio of the vinyl chloride copolymer (A) to the thermosetting resin (B) is from 99:1 to 50:50, especially from 95:5 to 60:40.

The organosol-type paints result from dispersing of vinyl chloride-type resin particles (C) in an organic solvent solution of the components (A) and (B) above. The vinyl chloride resin particles (C) used are produced by emulsion polymerization or suspension polymerization of vinyl chloride alone or with a combination of vinyl chloride with a small amount of another vinyl monomer such as butadiene, styrene or vinyl acetate, and have a particle diameter of generally 1 to 10 microns, particularly 0.02 to 5 microns. Paints of this type preferably contain 5 to 50% by weight of (A), 1 to 20% by weight of (B) and 5 to 50% by weight of (C), based on the resin solids.

In carrying out the process of this invention. (I) an organic solvent solution of the paint resin and (II) an organic solvent solution of the acrylic resin are prepared, and the solutions (I) and (II) are intimately mixed to form a starting solution. The organic solvent for this solution may be one or more solvents selected from, for example, aromatic hydrocarbon solvents such as toluene and xylene, ketone solvents such as acetone, methyl ethyl ketone, methyl isobutyl ketone and cyclohexane, alcohol solvents such as ethanol, propanol and butanol, Cellosolve-type solvents such as ethyl Cellosolve and butyl Cellosolve, and ester solvents such as ethyl acetate and butyl acetate. The concentration of the resin components in the starting solution is suitably 5 to 80% by weight in general, especially 20 to 70% by weight. As desired a known paint additive such as a plasticizer, a lubricant, a pigment, a filler or a stabilizer may be incorporated in the starting solution.

In accordance with one preferred embodiment of this invention, in an emulsion type water paint comprising an acrylic resin component, an epoxy resin component and a resol type phenolic resin as indispensable components, formation of the above-mentioned hard spots is prevented and the smoothness of the coated film and the covering completeness can be improved by adjusting the composition ratio of the above indispensable components. The above-mentioned continuous production process is most preferred for formation of this water paint because the viscosity of the resin solution is high.

The epoxy resin component, the resol type phenolic resin and the composition ratio of the three components will now be described in detail.

EPOXY RESIN

A bisphenol A type epoxy resin obtained by polycondensing a bisphenol such as bisphenol A with an epihalohydrin is preferred as the epoxy resin. Preferably, the epoxy equivalent of the epoxy resin is generally 400 to 20,000 and especially 1,000 to 5,000, and the number average molecular weight is generally 1,000 to 20,000 and especially 2,000 to 13,000.

RESOL TYPE PHENOLIC RESIN

In this invention, a resol type phenolic resin in which at least 30 mole%, especially at least 45 mole%, of the total methylol groups are alkyl-etherified is used as the resol type phenolic resin. If the degree of etherification is below the above-mentioned range, it becomes difficult to reduce the water solubility of the low-molecular-weight component in the resol type resin, and formation of hard spots on the surface of the coated film can hardly be prevented.

A precondensate obtained by condensing a bifunctional, trifunctional or tetrafunctional phenol such as phenol, p-cresol, m-cresol, o-cresol, p-tertbutylphenol, p-tert-amylphenol, p-phenylphenol, xylenol, o-ethylphenol, p-ethylphenol, m-ethylphenol, resorcinol, hydroquinone, o-methoxyphenol, p-methoxyphenol, m-methoxyphenol or bisphenol A with formaldehyde in the presence of an alkali catalyst. In general, a precondensate having a number average molecular weight of 150 to 1,000 is advantageously used.

A mono-nuclear product represented by the following formula:

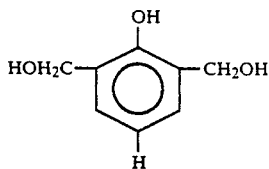
(1)

wherein R stands for an alkyl group, or a bi-nuclear product represented by the following formula:

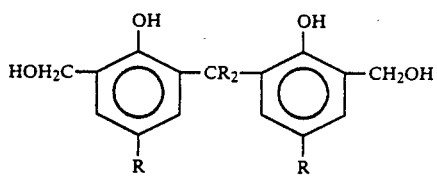
(2)

wherein R stands for an alkyl group, is contained in a certain distribution amount in the obtained resol type phenolic resin, and this low-molecular-weight component takes an important role as regards the curing speed of the coated film or the adhesion of the coated film to the metallic substrate, as pointed out hereinbefore. In this invention, it is preferred that a resol type phenolic resin containing a low-molecular-weight component composed of the above-mentioned mono-nuclear and bi-nuclear products in an amount of 10 to 98% by weight, especially 20 to 95% by weight, be used.

The alkyl-etherification of the methylol groups of the resol type phenolic resin is accomplished by reacting the methylol groups of the resin with an alcohol in the presence of an etherification catalyst, especially an acid catalyst, as represented by the following formula:

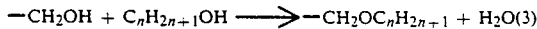

Methanol, ethanol, n-propanol, isopropanol, n-butanol, isobutanol and tert-butanol can be used as the alcohol. An alcohol having 3 to 6 carbon atoms, especially butanol, is preferred.

Phosphoric acid, sulfuric acid, hydrochloric acid, an aromatic sulfonic acid such as p-toluene-sulfonic acid, oxalic acid and acetic acid can be used as the etherification catalyst. For the synthesis of this resin, a dissolved methylol group-containing thermosetting resin is reacted with an alcohol as mentioned above in an appropriate solvent in the presence of the above-mentioned catalyst. The amount used of the catalyst is such that the pH value of the reaction mixture is 4 to 6, and the reaction temperature is preferably 70° to 90° C. An excess of the alcohol, toluene and xylene can be used singly or in combination as the solvent. The reaction is advantageously carried out while removing water formed as the by-product. For this purpose, it is preferred that the reaction be carried out while removing water from the system by azeotropic distillation with the solvent. Of course, if the amount of the alcohol in the system is insufficient, an additional amount of the alcohol can be supplied.

The preparation of the phenolic resin and the alkyl etherification can be carried out at one step or at different steps. For example, there can be adopted a process in which the reaction of the phenol with formaldehyde is carried out in a medium containing the alcohol in the presence of an alkali catalyst, and after the desired methylolated resin is formed, the acid catalyst is added to the reaction mixture and the alkyl etherification is carried out while maintaining the above-mentioned pH value. Alternatively, there can be adopted a process in which the formed methylolated resin is separated by known means and the resin is alkyl-etherified in a different system.

The obtained alkyl-etherified resin can be neutralized, washed with water and dried and be used as the coating film-forming component, or the salt and the like formed by the neutralization are removed and the resulting solution can be directly used as the resin solution.

COMPOSITION RATIO

The present invention is prominently characterized in that irrespectvely of the composition ratio between the epoxy resin and the phenolic resin, the paint resin can be emulsified and diepersed with a fine dispersed particle size. The epoxy resin/phenolic resin weight ratio is generally from 95/5 to 40/60 and especially from 90/10 to 50/50.

It is important that the acrylic resin as the polymeric dispersant should be made present so that the acid value is 2 to 30, especially 5 to 20, based on the paint resin component and the amount of the acrylic resin is 3 to 30% by weight, especially 5 to 25% by weight. If the acid value is too small and below the above range, it is difficult to disperse the resin component in the form of an o/w type emulsion, and even if the resin component is forcibly dispersed, the dispersion stability is poor. If the acid value exceeds the above range, when the resulting paint is used as a can paint, the hot water resistance of the coated film is reduced and the corrosion resistance after the retort sterilization is degraded.

In the present invention, reaction such as copolymerization, graft polymerization or block polymerization may be effected in the respective resin components. For example, precondensation may be effected between the epoxy resin component and the phenolic resin component. Furthermore, a carboxyl group-excessive acrylic resin/epoxy resin formed by cooking the acrylic resin component and the epoxy resin component can be used.

It is preferred that the amount used of the organic solvent be up to 30% by weight, especially up to 15% by weight, based on the resin components. Of course, one or both of the resin components can be fed in the form of an organic solvent solution to the kneading step.

In the case where melt kneading is carried out, a kneader, a Banbury or a single-screw or twin-screw extruder can be used.

The addition of water and the removal of the organic solvent can be conducted according to the solution phase inversion process described hereinbefore.

The water paint of this invention can be coated at a viscosity suitable for the coating on various metal blanks, can barrels, can lids and other members. This water paint can be coated not only by ordinary spray coating or electrostatic coating but also by roller coating, brush coating, doctor coating, air knife coating or reverse roll coating.

The process for the continuous production of the emulsion type water paint according to this invention will now be described in detail with reference to the following examples.

Incidentally, all of "parts" and "%" in the examples are by weight unless otherwise indicated, and the paints and coated sheets were evaluated in the examples and comparative examples according to the following methods unless other special methods are mentioned.

(1) Stability of Paint with Lapse of Time

A glass jar having an inner capacity of 100 ml was charged with 100 ml of an emulsion type water paint to and the jar was sealed and stored for 1 month in a thermostat tank maintained at 50° C. Then, the jar was opened and the paint was examined. Namely, it was checked whether or not skinning was caused on the surface, and the viscosity of the emulsion type water paint and the average particle size of the resin particles were examined and compared with those before the storage.

(2) Coating Property

An emulsion type water paint to be tested was coated on an electrolytically chromate-treated steel sheet (hereinafter referred to as "TFS") by using a roll coater, and baked and cured at 210° C. for 10 minutes. The coating thickness was adjusted to about 5 μm. Formation of a convexity-concavity pattern on the coated surface was checked with the naked eye.

(3) Adherence and Resistance to Whitening by Retorting

The above-mentioned coated sheet was cut into a width of 5 mm and bonded to a hot plate heated at 200° C.
by pressing for 2 minutes by using a nylon adhesive. The T-peel strength was measured. The initial peel strength just after the bonding and the peel strength with the lapse of time after 1 week's immersion in hot water at 90° C. were determined. A part of the coated sheet was subjected to the retort treatment at 125° C. for 30 minutes and it was checked whether or not whitening of the coating was caused by the retort treatment.

(4) Actual Can Evaluation

In case of a certain emulsion water paint, one surface of TFS was coated with the sample paint by a roll coater, and the coating was baked and dried at 210° C. for 10 minutes. Then, the other surface was similarly coated and baked to prepare a double-coated sheet. The thickness of each coating was adjusted to about 4 μm. By using this coated sheet and a nylon type adhesive, a bonded can barrel having a nominal diameter of 202 was prepared (both the ends were subjected to the neck-in processing and the nominal diameter was reduced to 200). A top lid was double-seamed to the can barrel and a content was filled in the can barrel and a bottom lid was double-seamed to obtain a canned product. The canned product was subjected to the retort sterilization at 120° C. for 90 minutes, cooled, air-dried and stored in a warehouse. After 6 months' storage, the can was opened, and whitening of the coated film or corrosion of the inner surface was checked. In case of a certain coated sheet, a can lid was formed from the coated sheet, and the can lid was similarly evaluated.

The extrusion rate of the stirrer in the in-line mixer was measured according to the following procedures. The treatment tank 1 of the first stage was singly set, and the resin solution supply line 5 was closed and the aqueous ammonia or aqueous amine supply line 6 was fixed in a water tank. The connecting tube 8 was kept open. In this state, priming water was supplied into the treatment tank 1 and the in-line mixer was driven, whereby water in the water tank was pumped up by the stirrer and water pumped up was discharged from the connecting tube 8. After the operation became stationary, water discharged through the connecting tube was collected for a certain time, and the volume of discharged water was measured and the extrusion rate of the stirrer under the above operation conditions was determined.

EXAMPLE 1

In 800 parts of a butyl acetate/n-butanol mixed solvent (butyl acetate/n-butanol=6/4) was dissolved 800 parts of a bisphenol A type epoxy resin having a number average molecular weight of about 3,750 and an epoxy equivalent of about 3,000. Separately, 200 parts of a resol type phenolic resin (bisphenol A/p-cresol=80/20, number average molecular weight=650) derived from bisphenol A, p-cresol and formaldehyde by using an ammonia catalyst was dissolved in 400 parts of a xylene/methylisobutylketone/cycrohexanone mixed solvent xylene/methylisobutylketone/cycrohexanone=1/1/1). The so-prepared resol type phenolic resin solution was mixed with the above-mentioned epoxy resin solution.

Separately, a mixture comprising 200 parts of ethyl acrylate, 200 parts of methyl methacrylate, 400 parts of methacrylic acid, 200 parts of styrene and 10 parts of tert-butyl hydroperoxide was prepared, and a flask equipped with a stirrer, a thermometer, a dropping funnel, a reflux cooling tube and an inert gas-introducing opening was charged with 500 parts of ethyl Cellosolve and 250 parts of the above-mentioned mixture. The temperature was elevated to 90° C. with stirring in a nitrogen current, and the remainder of the above-mentioned monomer mixture was dropped into the flask maintained at the above temperature over a period of 3 hours to effect copolymerization. Then, 1 part of tert-butyl hydroperoxide was added and stirring was conducted for 3 hours at the above-mentioned temperature. Then 500 parts of ethyl Cellosolve was added to the reaction mixture and the reaction mixture was cooled to complete the reaction. The weight average molecular weight of the obtained acrylic resin was about 120,000 and the acid value was 124, and the solid content of the resin solution was 50%.

Then, 20 parts of the acrylic resin solution was added to 160 parts of the mixed solution of the epoxy resin and the phenolic resin, and the mixture was stirred and uniformly blended to form an organic solvent solution of a paint resin. Separately, an aqueous solution of an amine was prepared by dissolving 4 parts of dimethylaminoethanol as a neutralizing agent into 90 parts of deionized water. Furthermore, deionized water to be supplied to the treatment tank of the second stage was prepared.

The extrusion rate of the stirrer in the in-line mixer of the first stage, measured by using water, was set at 25 l/min, and the organic solution of the paint resin and the aqueous amine were fed at rates of 1.8 l/min and 0.95 l/min, respectively, in the treatment tank of the first stage by using metering pumps and simultaneously, the stirrer was driven. The line for compressing the interior of the tank was closed. The extrusion rate of the stirrer in the treatment tank of the second stage was set at 20 l/min, and the stirrer was driven while supplying deionized water at a rate of 1.45 l/min into the treatment tank of the second stage. The constant rate discharge value was adjusted so that the extrusion rate from the treatment tank of the second stage was about 4.2 l/min. As the result, the inner pressure was about 1.2 kg/cm² (gauge). At this time, the stirring efficiency of the in-line mixer of the first stage was about 9.1 and the stirring efficiency of the in-line mixer of the second stage was about 4.8.

The material discharged during the initial operation period of 30 seconds was discarded, and the material extruded afterward was recovered. The extruded material was a stable o/w type emulsion, and the average particle size of the dispersed phase was 0.65 μm. By using a rotary evaporator, 420 parts of this o/w type emulsion was concentrated and the solvent was removed, whereby 120 parts of water and 95 parts of the organic solvent were recovered and an emulsion type water paint (paint 1) having a solid content of 40.2% was obtained.

Ten emulsion type water paints (paint 2 through 11) were prepared in the same manner as described above with respect to paint 1 except that 10 amines shown in Table 1 were independently used as the neutralizing agent. The average particle size of resin particles of each emulsion type water paint is shown in Table 1.

When the stability with the lapse of time was examined with respect to each of these emulsion type water paints (paints 1 through 11), it was found that skinning was not caused on the surface in any paints. Furthermore, in any of these emulsion type water paints, the viscosity and the average particle size of the resin particles were not different from those before the storage. When the coating operation was carried out by using a roll coater, each emulsion type water paint had a good coating property, and the convexity-concavity pattern formed on the coated surface was so small that no practical trouble arose. The adherence and the resistance to whitening by retorting were evaluated, and the actual can evaluation test was carried out by filling consomme into the can barrel. The obtained results are shown in Table 1.

TABLE 1

| Paint No. | Neutralizing Agent | Average Particle Size (μm) of Resin Particles | Initial Peel Strength (kg/5 mm) | Peel Strength (kg/5 mm) with Lapse of Time | Resistance to Whitening by Retorting | Results of Actual Can Test |
| --- | --- | --- | --- | --- | --- | --- |
| 1 | dimethylaminoethanol | 0.65 | 6.8 | 3.7 | not whitened | reduction of adherence. pitting in processed part |
| 2 | ammonia | 0.58 | 7.0 | 3.8 | " | reduction of adherence. pitting in processed part |
| 3 | isopropylamine | 0.59 | 7.1 | 4.8 | " | no change |
| 4 | sec-butylamine | 0.63 | 7.1 | 4.5 | " | " |
| 5 | tert-butylamine | 0.76 | 6.9 | 4.7 | " | " |
| 6 | morpholine | 0.68 | 7.2 | 4.6 | " | " |
| 7 | isoamylamine | 0.55 | 7.1 | 4.7 | " | " |
| 8 | pyrrolidine | 0.78 | 7.0 | 4.8 | " | " |
| 9 | n-propylamine | 0.66 | 6.8 | 2.7 | " | reduction of adherence, corrosion below coating |
| 10 | n-butylamine | 0.84 | 6.9 | 3.1 | " | reduction of adherence, pitting in processed part |
| 11 | triethylamine | 0.71 | 7.1 | 2.6 | " | reduction of adherence, corrosion below coating |

EXAMPLE 2

The organic solvent solution of the paint resin, the aqueous amine and deionized water, used in Example 1, were similarly prepared, and seven emulsion type water paints (paints 12 through 18) were prepared in the same manner as described in Example 1 except that they were fed to the treatment tanks of the first and second stages at rates shown in Table 2. The stirring efficiency in the in-line mixer of the first stage, the inner pressure in the treatment tank and the average particle size of the dispersed phase in the obtained o/w type emulsion are shown in Table 2.

Each o/w type emulsion was concentrated and the solvent was removed by using a rotary evaporator, whereby an emulsion type water paint having a solid content of about 40% was obtained. With respect to each paint, the stability with the lapse of time and the coating property at the coating operation using a roll coater were evaluated. The obtained results are shown in Table 2.

EXAMPLE 4

To a mixture of 160 parts of the epoxy resin solution prepared in Example 1 and 40 parts of the acrylic resin solution prepared in Example 1 was added 5 parts of morpholine, and the mixture was stirred under reflux at 120° C. for 90 minutes to effect reaction between the epoxy resin and the acrylic resin and obtain a copolymer. Then, 60 parts of the resol type phenolic resin solution used in Example 1 was added to 200 parts of the obtained organic solvent solution of the copolymer and the mixture was stirred to form an organic solvent solution of a paint resin. Separately, the aqueous amine and deionized water were prepared in the same manner as described in Example 1.

By using them, an o/w type emulsion was prepared according to the same procedures as described in Example 1, and the emulsion was concentrated and the solvent was removed to obtain an emulsion type water paint (paint 25). The average particle size of the dispersed phase of this emulsion type water paint water paint was 0.52 μm. When the stability with the lapse of time was examined, it was found that skinning was not caused on the liquid surface. The viscosity and the average particle size of the resin particles were not changed by the storage. When the coating test was carried out by using a roll coater, it was found that the coating property was good and the convexity-concavity pattern

TABLE 2

| Paint No. | Organic Solvent Solution (l/min) | Aqueous Amine (l/min) | Deionized Water (l/min) | Stirring Efficiency | Inner Pressure [kg/cm²(gauge)] in Treatment Tank | Average Particle Size (μm) | Stability and Coating Property of Paint |
|---|---|---|---|---|---|---|---|
| 12 | 1.2 | 1.5 | 1.6 | 9.3 | 1.0 | 5.27 | sedimentation, prominent ribs on coated surface |
| 13 | 1.4 | 1.3 | 1.6 | 9.3 | 1.1 | 1.05 | good stability with lapse of time, good coating property |
| 14 | 1.8 | 0.9 | 1.6 | 9.3 | 1.2 | 0.66 | good stability with lapse of time, good coating property |
| 15 | 1.9 | 0.8 | 1.6 | 9.3 | 1.2 | 0.58 | good stability with lapse of time, good coating property |
| 16 | 2.1 | 0.6 | 1.6 | 9.3 | 1.3 | 0.69 | good stability with lapse of time, good coating property |
| 17 | 2.4 | 0.3 | 1.6 | 9.3 | 1.4 | 0.94 | good stability with lapse of time, good coating property |
| 18 | 2.5 | 0.2 | 1.6 | 9.3 | 1.4 | 4.33 | sedimentation, prominent ribs on coated surface |

EXAMPLE 3

The organic solvent solution of the paint resin, the aqueous amine and deionized water, used in Example 1, were similarly prepared, and six emulsion type water paints (paints 19 through 24) were prepared in the same manner as described in Example 1 except that they were fed to the treatment tanks of the first and second stages while adjusting the extrusion rate of the stirrer in the in-line mixer of the first stage. The stirring efficiency in the in-line mixer of the first stage, the inner pressure in the treatment tank, the liquid temperature in the treatment tank and the average particle size of the dispersed phase in the obtained o/w type emulsion are shown in Table 3.

By using a rotary evaporator, each o/w type emulsion was concentrated and the solvent was removed, whereby an emulsion type water paint having a solid content of about 40% was obtained. With respect to each emulsion type water paint, the stability with the lapse of time and the coating property at the coating operation using a roll coater were evaluated. The obtained results are shown in Table 3.

TABLE 3

| Paint No. | Stirring Efficiency | Inner Pressure [kg/cm² (gauge)] of Treatment Tank | Liquid Temperature (°C.) in Treatment Tank | Average Particle Size (μm) | Stability and Coating Property of Paint |
|---|---|---|---|---|---|
| 19 | 5.2 | 0.6 | 25 | 1.23 | slight sedimentation, small ribs |
| 20 | 7.0 | 0.9 | 32 | 0.64 | good stability, good coating property |
| 21 | 9.8 | 1.2 | 44 | 0.56 | good stability, good coating property |
| 22 | 20.3 | 2.0 | 61 | 0.59 | good stability, good coating property |
| 23 | 35.1 | 3.4 | 79 | 0.62 | good stability, good coating property |
| 24 | 49.5 | 5.1 | 96 | 0.55 | good stability, good coating property | formed on the coated surface was such that no practical problem arose.

EXAMPLE 5

By using the same organic solvent solution of the paint resin and the same aqueous amine and deionized solution as used in Example 4, six o/w type emulsions were prepared in the same manner as described in Example 1 except that the amount of deionized water supplied to the in-line mixer of the second stage was changed. The amount of deionized water supplied to the in-line mixer of the second stage per 100 parts of the w/o type emulsion fed to the in-line mixer of the second stage is shown in Table 4. The average particle size of the dispersed phase of each of the obtained o/w type emulsions is shown in Table 4.

By using a rotary evaporator, these o/w type emulsions were concentrated and the solvent was removed to obtain emulsion type water paints (paints 26 through 31) having a solid content of about 40%. When the stability with the lapse of time was examined, it was found that skinning was not caused on the liquid surface in any of the paints, and in any of the emulsion type water paints, the viscosity and the average particle size of the resin particles were not changed by the storage. When the coating test was carried out by using a roll coater, each of the emulsion type water paints had a good coating property and the convexity-concavity pattern on the coated surface was such that no practical problem arose.

TABLE 4

| Paint No. | Amount (parts) of Deionized Water Supplied | Average Particle Size ($\mu$m) |
|---|---|---|
| 26 | 30 | 0.99 |
| 27 | 40 | 0.74 |
| 28 | 55 | 0.56 |
| 29 | 70 | 0.54 |
| 30 | 80 | 0.58 |
| 31 | 100 | 0.61 |

EXAMPLE 6

By using a rotary evaporator, the organic solvent solution of the paint resin used in Example 1 was concentrated at 80° C. to obtain a solution having a solid content of 60, 70 or 80%. Separately, the organic solvent solution of the paint resin used in Example 1 was diluted with butyl acetate to form a solution having a solid content of 10, 20 or 30%. These solution were converted to o/w type emulsions by using morpholine as the neutralizing agent according to the same procedures as described in Example 1. At this operation, the organic solvent solution of the paint resin was supplied in the heated or cooled state. In order to perform stirring and mixing efficiently, the interior of the treatment tank was compressed. The temperature of the organic solvent solution of the paint resin fed to the in-line mixer and the inner pressure of the treatment tank are shown in Table 5. These o/w type emulsions were concentrated and the solvent was removed to obtain emulsion type water paints (paint 32 through 37).

With respect to each of these emulsion water paints, the average particle size of the resin particles and the stability with the lapse of time were examined. The obtained results are shown in Table 5.

TABLE 5

| Paint No. | Solid Content (%) in Paint Resin Solution | Temperature (°C.) of Paint Resin Solution | Inner Pressure [kg/cm$^2$ (gauge)] in Treatment Tank | Average Particle Size ($\mu$m) | Stability of Emulsion Type Water Paint with Lapse of Time |
|---|---|---|---|---|---|
| 32 | 10 | 10 | 0.2 | 0.48 | no change |
| 33 | 20 | 10 | 0.5 | 0.52 | no change |
| 34 | 30 | 20 | 1.5 | 0.51 | no change |
| 35 | 60 | 70 | 8.1 | 0.65 | no change |
| 36 | 70 | 80 | 9.0 | 0.77 | no change |
| 37 | 80 | 90 | 9.9 | 3.05 | some resin particles sedimented and separated |

EXAMPLE 7

Six epoxy resins having molecular weights and epoxy equivalents shown in Table 6 were prepared and dissolved in the same mixed solvent as used in Example 1. Organic solvent solutions of paint resins were prepared by using these epoxy resin solutions and the same phenolic resin solution and acrylic resin solution as used in Example 1. By using these organic solvent solutions of paint resins and morpholine as the neutralizing agent, six emulsion type water paints (paints 38 through 43) were prepared according to the same procedures as described in Example 1.

With respect to each of these emulsion type water paints, the stability with the lapse of time was examined. It was found that skinning was not caused on the liquid surface in any of the emulsion type water paints. The viscosity and the average particle size of resin particles were not changed in any of the emulsion type water paints by the storage. When the coating test was carried out by using a roll coater, it was found that each of the emulsion type water paints had a good coating property, and the convexity-concavity pattern on the coated surface was such that no practical problem arose. The actual can test was carried out by filling a coffee drink in can barrels formed by using these emulsion type water paints, and the adherence and the resistance to whitening by retorting were evaluated. The obtained results are shown in Table 6.

TABLE 6

| Paint No. | Number Average Molecular Weight of Epoxy Resin | Epoxy Equivalent | Adherence | Resistance to Whitening by Retorting | Actual Can Test |
|---|---|---|---|---|---|
| 38 | 900 | 480 | good | not whitened | Slight pitting in processed part |
| 39 | 1,950 | 1,100 | good | " | no change |
| 40 | 3,900 | 2,900 | good | " | " |

TABLE 6-continued

| Paint No. | Number Average Molecular Weight of Epoxy Resin | Epoxy Equivalent | Adherence | Resistance to Whitening by Retorting | Actual Can Test |
|---|---|---|---|---|---|
| 41 | 9,600 | 4,200 | good | " | " |
| 42 | 12,700 | 5,300 | good | " | " |
| 43 | 21,000 | 19,000 | good | slightly whitened | slight whitening of coated film |

EXAMPLE 8

Four curing agent resins shown in Table 7 were dissolved in the same manner as described in Example 1, and by using these solutions and the same epoxy resin solution and acrylic resin solutions as used in Example 1, organic solvent solutions of paint resins were prepared. By using these solvent solutions and secbutylamine as the neutralizing agent, four emulsion type water paints (paints 44 through 47) were prepared according to the same procedures as described in Example 1.

When the stability with the lapse of time was examined, it was found that skinning was not caused on the liquid surface in any of the emulsion type water paints. In any of the emulsion type water paints, the viscosity and the average particle size of resin particles were not changed by the storage. When the coating test was carried out by using a roll coater, it was found that each of the emulsion type water paints had a good coating property, and the convexity-concavity pattern on the coated surface was such that no practical trouble arose. These coated plates were formed into can lids and were seamed to cans filled with a coffee drink, and the cans were stored for 6 months and the states of the can lid surfaces were examined. The obtained results are shown in Table 7.

TABLE 7

| Paint No. | Curing Agent Resin | State of Can Lid Surface after Storage |
|---|---|---|
| 44 | resol type phenolic resin having molecular weight of about 300 | no change |
| 45 | resol type phenolic resin having molecular weight of about 1000 | " |
| 46 | urea resin | " |
| 47 | malamine resin | " |

EXAMPLE 9

A resin solution was prepared by mixing the epoxy resin and phenolic resin used in Example 1 at a ratio shown in Table 8, and the acrylic resin solution used in Example 1 was added to this resin solution to obtain an organic solvent solution of a paint resin. Incidentally, the dissolution of the epoxy resin and phenolic resin was carried out in the same manner as described in Example 1, and the amount added of the acrylic resin solution was adjusted so that the resin solid content was the same as in Example 1. By using this organic solvent solution of the paint resin and morpholine as the neutralizing agent, six emulsion type water paints (paints 48 through 53) were prepared according to the same procedures as described in Example 1.

When the stability with the lapse of time was examined, it was found that skinning was not caused on the liquid surface in any of the emulsion type water paints. In any of the emulsion type water paints, the viscosity and the average particle size of resin particles were not changed by the storage. When the coating test was carried out by using a roll coater, it was found that each of the emulsion type water paints had a good coating property, and the convexity-concavity pattern on the coated surface was such that no practical rouble arose. Consomme soup was filled in can barrels formed by using these emulsion type water paints and the actual can test was carried out. The obtained results are shown in Table 8.

TABLE 8

| Paint No. | Epoxy Resin/ Phenolic Resin | Results of Actual Can Test |
|---|---|---|
| 48 | 98/2 | slight whitening on coated film on inner surface of can |
| 49 | 95/5 | no change |
| 50 | 75/25 | " |
| 51 | 55/45 | " |
| 52 | 40/60 | " |
| 53 | 30/70 | pitting on processed part on inner surface of can |

EXAMPLE 10

Eight emulsion type water paints (paints 54 through 61) were prepared in the same manner as described in Example 1 except that eight acrylic resins having acid values shown in Table 9 were added in amounts shown in Table 9. The amount of the acrylic resin is expressed by parts of the resin solids per 100 parts of the sum of the epoxy resin and phenolic resin.

With respect to each of these emulsion type water paints, the stability with the lapse of time was examined, and can barrels formed by coating TFS with these emulsion type water paints were filled with consomme soup and the actual can test was carried out. The obtained results are shown in Table 9.

TABLE 9

| Paint No. | Acid Value of Acrylic Resin | Amount Added (%) | Acid Value of Paint Resin | Stability of Paint | Results of Actual Can Test |
|---|---|---|---|---|---|
| 54 | 20 | 28 | 5.6 | sedimentation | Pitting on irregularly coated parts |
| 55 | 35 | 22 | 7.7 | no change | no change |
| 56 | 70 | 12 | 8.4 | " | " |
| 57 | 150 | 7 | 10.5 | " | " |
| 58 | 250 | 6 | 15.0 | " | " |
| 59 | 330 | 5 | 16.5 | " | " |
| 60 | 350 | 5 | 17.5 | " | " |

TABLE 9-continued

| Paint No. | Acid Value of Acrylic Resin | Amount Added (%) | Acid Value of Paint Resin | Stability of Paint | Results of Actual Can Test |
| --- | --- | --- | --- | --- | --- |
| 61 | 400 | 5 | 20.0 | sedimentation | pitting on irregularly coated parts |

EXAMPLE 11

An organic solvent solution of a paint resin was prepared by uniformly stirring and mixing 220 parts of the mixed solution of the epoxy resin solution and phenolic resin solution used in Example 1, 10 parts of the acrylic resin solution used in Example 1 and 5 parts of oleic acid. An o/w type emulsion was prepared by using this organic solvent solution of the paint resin and isopropylamine as the neutralizing agent according to the same procedures as described in Example 1. The emulsion was concentrated and the solvent was removed to obtained an emulsion type water paint (paint 62).

The average particle size of resin particles in this emulsion type paint was about 0.56 μm. Even after the paint was stored at 50° C. for 1 month, no sedimentation of the resin particles was caused, and skinning was not observed and the viscosity was not substantially changed.

Preferred emulsion type water paints of the present invention will now be described with reference to the following examples.

EXAMPLE 12

A solution was prepared by dissolving 20 parts of a resol type phenolic resin (bisphenol A/p-cresol=80/20, number average molecular weight=650) derive from bisphenol A, p-cresol and formaldehyde in the presence of an ammonia catalyst, into 40 parts of a xylene/methylisobutylketone/ cyclohexanone/n-butanol mixed solvent (xylene/methylisobutylketone/cyclohexanone/n-butanol=1/1/1/1), and when this phenolic resin was analyzed by the gel permeation chromatography (hereinafter referred to as "GPC"), it was confirmed that the phenolic resin contained 26% of the components having one or two benzene rings. The phenol resin solution was stirred under reflux at 115° C. for 2 hours to etherify some of methylol groups of the phenol resin. From the results of the unclear magnetic resonance (hereinafter referred to as "NMR") analysis, it was confirmed that 68% of the total methylol groups were etherified.

A solution was prepared by dissolving 80 parts of a bisphenol A type epoxy resin having a number average molecular weight of about 3750 and an epoxy resin of about 3000 in 160 parts of butyl Cellosolve, and the solution was mixed with the above-mentioned phenolic resin solution.

Separately, a mixture comprising 20 parts of ethyl acrylate, 20 parts of methyl methacrylate, 40 parts of methacrylic acid, 20 parts of styrene and 1 part of tert-butyl hydroperoxide was prepared, and a flask equipped with a stirrer, a thermometer, a dropping funnel, a reflex cooling tube and an inert gas introduction opening was charged with 50 parts of ethyl Cellosolve and 25 parts of the above mixture. The temperature was elevated to 90° C. with stirring in a nitrogen gas current, and the remainder of the above monomer mixture was dropped into the flask maintained at the above temperature to effect copolymerization. Furthermore, 0.1 part of tert-butyl hydroperoxide was added to the reaction mixture and stirring was conducted at the above temperature for 3 hours, and 50 parts of ethyl Cellosolve was added and the reaction mixture was cooled to complete reaction. The weight average molecular weight of the obtained acrylic resin was about 120,000, the acid value was 124, and the solid content of the resin solution was 50%.

Then, 300 parts of the mixed solution of the above-mentioned epoxy resin solution and phenolic resin solution was precondensed at 115° C. for 4 hours, and 20 parts of the above-mentioned acrylic resin was added and the mixture was stirred until the mixture became homogeneous.

Then, aqueous ammonia was formed by dissolving 6 parts of aqueous ammonia having a concentration of 28% in 450 parts of deionized water, and this aqueous ammonia was gradually dropped into the total amount of the above-mentioned mixed solution of the epoxy resin, phenolic resin and acrylic resin with violent stirring. At the initial stage of the addition of the aqueous ammonia, the viscosity of the system abruptly rose and a white creamy product was obtained, but with advance to the addition of the aqueous system, the viscosity gradually lowered. At this stage, the addition of the aqueous ammonia was interrupted and stirring was continued, and after the system became a homogeneous dispersion, the addition of the aqueous ammonia was started again. At this point, the viscosity of the system was abruptly reduced. The addition of the aqueous ammonia was conducted with stirring, and after completion of the addition of the total amount of the aqueous ammonia, a stable o/w type emulsion was formed.

This emulsion was concentrated by a rotary evaporator, about 300 parts of water and about 200 parts of the organic solvent were recovered to adjust the solid content to 40%. The liquid was filtered through a glass filter #1 to obtain an emulsion type water paint (paint 101). The average particle size of resin particles of the emulsion type water paint was 0.61 μm, and the paint contained 3.6% of the organic solvent based on the paint.

A glass jar having a volume of 100 ml was charged with 100 ml of the obtained emulsion type aqueous paint, and the jar was sealed and stored in a thermostat tank maintained at 50° C. for 1 month. Then, the jar was opened and the state of the paint was examined. It was found that skinning was not caused on the liquid surface, and the viscosity of the emulsion type water paint and the average particle size of resin particles were not different form those before the storage.

One surface of a TFS was coated with the above-mentioned emulsion type water paint, and the coating was baked and cured at 210° C. for 10 minutes. When the coated surface was examined with the naked eye, hard spots were not observed at all.

The coated sheet was bonded by using a nylon type adhesive and a hot press heated at 200° C. for 2 minutes. The T-peel strength was measured. The initial peel strength just after bonding was about 7.1 kg/5 mm of width, and the peel strength with the lapse of time, measured after 1 week's immersion in warm water at 90° C., was at least 4.5 kg/5 mm of width. When the bonded test piece was retorted at 125° C. for 30 minutes and was checked, it was found that the bonding strength was maintained at a level of at least 4.5 kg/5 mm of width, and whitening of the coated film was not observed.

Separately, one surface of TFS was coated with the above-mentioned emulsion type water paint by a roll coater and baked and dried at 210° C. for 10 minutes. The other surface was similarly coated and baked to prepare a double-coated sheet. By using this coated sheet and a nylon type adhesive, a bonded can barrel having a nominal diameter of 202 (both the ends were subjected to the neck-in processing and the nominal diameter was reduced to 200) was formed, and a bottle lid was double-seamed to the can barrel. Then, the can barrel was filled with coffee drink and a top lid was double-seamed to the can barrel. The canned coffee drink was retort-sterilized at 125° C. for 30 minutes, cooled, air-dried and stored in a warehouse for 6 months. The can was opened and the state of the can was examined. Troubles such as whitening of the coated film and corrosion of the inner surface were not caused.

COMPARATIVE EXAMPLE 1

An emulsion type water paint (comparative paint 201) was prepared in the same manner as described in Example 12 except that the resol type phenolic resin was used without butyl etherification. TFS was coated with the water paint by using a roll coater, and after baking, the coated sheet was examined with the naked eye. Hard spot-like convexities and concavities were conspicuous on the surface of the coated film, and the appearance of the coated sheet was inferior to that of the coated sheet obtained in Example 12.

EXAMPLE 13

A solution prepared by dissolving 80 parts of a bisphenol a type epoxy resin having an number average molecular weight of about 3400 and an epoxy equivalent of about 1100 in 80 parts of butyl Cellosolve was mixed with 80 parts of the acrylic resin solution used in Example 12. The mixed solution was changed with a 4-neck flask, and 16 parts of diethylaminoethanol was added to the mixed solution with stirring to neutralize the carboxyl groups in the acrylic resin. The liquid temperature was elevated to 80° C. and stirring was conducted at this temperature for 30 minutes, and then, the liquid was cooled to room temperature. By the GPC measurement, it was confirmed that the epoxy resin was copolymerized with the acrylic resin and the molecular weight increased. Furthermore, by an infrared spectrophotometer, the presence of the epoxy group and the salt of the carboxyl group was confirmed.

Then, 240 parts of the above-mentioned copolymer resin solution was mixed with 60 parts of the butyl-etherified resol type phenolic resin solution used in Examples 1 and 12, and an emulsion type water paint (paint 102) was prepared according to the same procedures as described in Example 12. The average particle size of resin particles in the emulsion type water paint was 0.58 82 m, the solid content was about 49%, and the content of the organic solvent was 4.6% based on the paint.

TFS was coated with this emulsion type water paint by a roll coater, and the coating was baked and cured at 210° C. for 10 minutes. When the coated surface was examined with the naked eye, it was found that hard spots were not formed.

COMPARATIVE EXAMPLE 2

An emulsion type water paint (comparative paint 202) was prepared in the same manner as described in Example 13 except that the resol type phenolic resin use din Example 12 was used without butyl etherification. TFS was coated with the emulsion type water paint and the coating was baked. When the coated sheet was examined with the naked eye, it was found that hard spot-like convexities and concavities were conspicuous on the coated surface. The appearance of the coated sheet was inferior to that of the coated sheet obtained in Example 13.

EXAMPLE 14

A resol type phenolic resin was synthesized from p-cresol and formaldehyde by using a magnesium hydroxide catalyst. The number average molecular weight of the obtained phenolic resin was 350, and it was confirmed that components having 1 to 2 benzene rings were contained in an amount of 56%. The phenolic resin was dissolved in the same solvent as used in Example 12, and the solution was stirred under reflux at 115° C. for a predetermined time to butyl-etherify some of methylol groups in the phenolic resin, whereby five solutions of butyl-etherified phenolic resins differing in the degree of butyl etherification were obtained. Each butyl-etherified phenolic resin was analyzed by NMR and the ratio (butyl etherification degree) of the butyl-etherified methylol groups to the original methylol groups was determined. The obtained results are shown in Table 10.

These butyl-etherified phenolic resin solutions and the non-butyl-etherified phenolic resin solution were mixed with the epoxy resin solution and acrylic resin solution used in Example 12, and six emulsion type water paints (paints 103 through 108) were prepared according to the same procedures as described in Example 12.

TFS was coated with these emulsion type water paints by using a roll coater, and the coatings were baked and cured at 210° C. for 10 minutes. The coated surfaces were examined with the naked eye. The obtained results are shown in Table 10.

TABLE 10

| Paint No. | Butyl Etherification Degree (%) | State of Coated Surface |
|---|---|---|
| 103 | 0 | many hard spots, bad appearance |
| 104 | 26 | some hard spots |
| 105 | 31 | no hard spots, good coated surface |
| 106 | 45 | no hard spots, good coated surface |
| 107 | 83 | no hard spots, good coated surface |
| 108 | 98 | no hard spots, good coated surface |

EXAMPLE 15

In 100 parts of a xylene/methylisobutylketone/cyclohexanone/alcohol mixed solvent (xylene/methylisobutylketone/cyclohexanone/alcohol=1/1/1/1) was dissolved in 50 parts of the resol type phenolic resin synthesized in Example 14, and the solution was stirred under reflux at a predetermined temperature for a predetermined time to alkyl-etherify some of the methylol groups in the phenolic resins. The alcohols (solvents) used for the alkyl etherification are shown in Table 11. By the NMR analysis, the ratio (alkyl etherification degree) of the alkyl-etherified methylol groups to the original methylol groups was determined. The obtained results are shown in Table 11.

By using these alkyl-etherified phenolic resin solutions and the epoxy resin solution and acrylic resin solution used in Example 12, five emulsion type water paints (paints 109 through 113) were prepared according to the same procedures as described in Example 12.

TFS was coated with these emulsion type water paints by using a roll coater, and the coatings were baked and cured at 210° C. for 10 minutes. The coated surfaces were examined with the naked eye. The obtained results are shown in Table 11.

butanol = 1/1/1/1), and the solution was stirred under reflux at 110° C. for 2 hours to butyl-etherify some of the methylol groups in the phenolic resin. By the NMR analysis, the ratio (butyl etherification degree) of the butyl-etherified methylol groups to the original methylol groups was determined. The obtained results are shown in Table 12.

By using these butyl-etherified phenolic resin solutions and the epoxy resin solution and acrylic resin solution used in Example 12, seven emulsion type water paints (paints 114 through 120) were prepared according to the same procedures as described in Example 12.

TFS was coated with these emulsion type water paints by using a roll coater, and the coatings were baked and cured at 210° C. for 10 minutes. The coated surfaces were examined with the naked eye, and initial adherence and the adherence with the lapse of time were evaluated in the same manner as described in Example 12. The obtained results are shown in Table 12.

TABLE 11

TABLE 12

| Paint No. | Number Average Molecular Weight | Low-Molecular-Weight Component Content (%) | Butyl Etherification Degree (%) | Initial Adherence (kg/5 mm) | Adherence with Lapse of Time (kg/5 mm) | State of Coated Surface |
|---|---|---|---|---|---|---|
| 114 | 250 | 99.5 | 56 | 6.9 | 1.8 | no hard spots, good coated surface |
| 115 | 290 | 98 | 65 | 7.0 | 4.5 | no hard spots, good coated surface |
| 116 | 350 | 94 | 68 | 7.1 | 4.7 | no hard spots, good coated surface |
| 117 | 520 | 45 | 85 | 7.1 | 4.5 | no hard spots, good coated surface |
| 118 | 680 | 22 | 75 | 7.0 | 4.6 | no hard spots, good coated surface |
| 119 | 870 | 11 | 64 | 7.0 | 4.5 | no hard spots, good coated surface |
| 120 | 1080 | 8 | 77 | 3.8 | 4.2 | no hard spots, good coated surface |

| Paint No | Alcohol | Alkyl Etherification Degree (%) | State of Coated Surface |
|---|---|---|---|
| 109 | n-propanol | 37 | no hard spots, good coated surface |
| 110 | i-propanol | 39 | no hard spots, good coated surface |
| 111 | i-butanol | 76 | no hard spots, good coated surface |
| 112 | n-hexanol | 89 | no hard spots, good coated surface |
| 113 | n-pantanol | 65 | no hard spots, good coated surface |

EXAMPLE 16

Seven resol type phenolic resins (bisphenol/p-cresol = 80/20) differing in the molecular weight distribution were synthesized from bisphenol A, p-cresol and formaldehyde by using a magnesium hydroxide catalyst. The contents of the components having 1 and 2 benzene rings (low-molecular-weight component contents) and the number average molecular weights of these phenolic resins are shown in Table 12. Then, 50 parts of each of the obtained resins was dissolved in 100 parts of a xylene/methylisobutylketone/cyclohexanone/i-butanol mixed solvent (xylene/methylisobutylketone/cyclohexanone/i-

EXAMPLE 17

The resol type phenolic resin solution used in Example 12 was not butyl-etherified but was directly mixed with the epoxy resin solution used in Example 12 and precondensation was carried out at 115° C. for 4 hours. By the NMR analysis, it was confirmed that 85% of the methylol groups in the phenolic resin were butyl-etherified.

By using this precondensate and the acrylic resins solution used in Example 12, an emulsion type water paint (paint 121) was prepared according to the same procedures as described in Example 12.

TFS was coated with this emulsion type water paint by using a roll coater, and the coated surface was examined with the naked eye. Formation of hard spots was not observed.

We claim:

1. An emulsion water paint, which comprises, as coating film-forming components, (i) a carboxyl group-containing acrylic resin component, (ii) an epoxy resin component and (iii) a resol phenolic resin component containing methylol groups, wherein the carboxyl group of the acrylic resin component is present in the form of an ammonium salt or amine salt, the coating film-forming components are present in the form of oil-in-water emulsion particles, and the resol phenolic resin is an alkyl-etherified resol phenolic resin in which at least 30 mol% of all of the methylol groups of the resol phenolic resin component are etherified by the reaction of the methylol groups with an alcohol.

2. An emulsion water paint as set forth in claim 1, wherein the carboxyl group-containing acrylic resin component and the epoxy resin component are present in the form of a copolymer.

3. An emulsion water paint as set forth in claim 2, wherein the copolymer contains free carboxyl groups and epoxy groups.

4. An emulsion water paint as set forth in claim 1, wherein the carboxyl group-containing acrylic resin component and the epoxy resin component are present in the form of a blend.

5. An emulsion water paint as set forth in claim 1, wherein the etherified resol phenolic resin component is a butyl-etherified resol phenolic resin.

6. An emulsion water paint as set forth in claim 1, wherein the resol phenolic resin component contains 10 to 98% by weight of a low-molecular-weight component comprising bi-nuclear and mono-nuclear products.

* * * * *